Oct. 18, 1960 W. D. LANDRY 2,956,725

BUSINESS-BY-CARRIER UNIT

Filed March 18, 1958 8 Sheets-Sheet 1

WALTER D. LANDRY
INVENTOR

BY Thomas F. Healy
ATTORNEY

WALTER D. LANDRY
INVENTOR

BY Thomas F. Healy
ATTORNEY

Oct. 18, 1960 W. D. LANDRY 2,956,725

BUSINESS-BY-CARRIER UNIT

Filed March 18, 1958 8 Sheets-Sheet 3

WALTER D. LANDRY
INVENTOR

BY Thomas F. Healy
ATTORNEY

WALTER D. LANDRY
INVENTOR

BY John A. Mawhinney
ATTORNEY

BUSINESS-BY-CARRIER UNIT

Filed March 18, 1958 8 Sheets-Sheet 5

WALTER D. LANDRY
INVENTOR

BY John A Mawhinney
ATTORNEY

INVENTOR
Walter D. Landry
BY John A. Mankinney
ATTORNEY

Oct. 18, 1960 W. D. LANDRY 2,956,725

BUSINESS-BY-CARRIER UNIT

Filed March 18, 1958 8 Sheets-Sheet 7

INVENTOR
Walter D. Landry

BY John A. Mawhinney
ATTORNEY

Oct. 18, 1960 W. D. LANDRY 2,956,725

BUSINESS-BY-CARRIER UNIT

Filed March 18, 1958 8 Sheets-Sheet 8

INVENTOR
Walter D. Landry

BY John A Mawhinney

ATTORNEY 2,956,725

BUSINESS-BY-CARRIER UNIT

Walter D. Landry, 349 N. Edison St., Arlington, Va.

Filed Mar. 18, 1958, Ser. No. 722,826

7 Claims. (Cl. 229—72)

The present invention relates to a business-by-carrier unit and is a continuation-in-part of my co-pending application, Serial No. 668,594, filed June 26, 1957, now abandoned, which in turn is a continuation-in-part of my application, Serial No. 590,244, filed on June 8, 1956, now abandoned.

The present invention relates to a business-by-carrier unit and has for an object the provision of a device of this kind which is especially adaptable for use by banks in connection with the bank-by-mail banking wherein the depositor signs his name and address only once.

A further object of the present invention is to provide a bank-by-mail unit which is efficient in operation to eliminate duplicate writing by the depositor and bank employee, with no need of transferring figures by the bank employee when sending a receipt to the depositor.

Another object is to provide a bank-by-mail device comprising or consisting of a unit including a bank deposit slip for the name and address of the depositor, a duplicate deposit slip and a carbon, and an envelope for said slip; the device being characterized by the fact that the deposit slips and carbon are not completely separated until after validation by the bank employee, and by the further fact that the name and address of a validated receipted deposit slip serves in mailing new deposit slips to the depositor, with other material as needed.

A further object of the present invention is to provide a unit of this character which includes a bank self-addressed envelope to which is attached a set of deposit slips including at least an original and duplicate deposit slip with carbon paper therebetween.

A still further object of the present invention is to provide a unit of this type in which the duplicate deposit slip on which the depositor has inscribed his name and address is used by the bank in returning the duplicate deposit slip and a new set of deposit slips.

The present invention aims to provide a business-by-carrier unit which will expedite the handling of the material to be transported, both by the sender and the recipient.

In one of its broadest aspects the present invention contemplates the provision of a business-by-carrier unit comprising a container provided with a compartment for receiving an article to be transported and a supplementary or alternative opening, mouth or passageway leading to the compartment for carrying an address bearing article to be transported, said supplementary passageway being of such dimensions that it carries the address bearing article with the address exposed to view.

More specifically the present invention contemplates the provision of a banking-by-mail unit comprising an envelope provided with a pocket for receiving bank deposit slips and checks and a supplementary opening for receiving half of a folded-in-two deposit slip, the other half of the deposit slip having an area adapted to have the name and address of a bank depositor inscribed therein and overlying the adjacent side of the envelope with said area exposed to view, an envelope for receiving the deposit slip receiving envelope having an elongated window therein, the width of said supplementary opening and said folded deposit slip being substantially the same to prevent movement of the deposit slip lengthwise of its envelope, said envelopes being of such relative lengths that the windowed envelope easily receives the other envelope but restrains the other envelope from lengthwise movement therein, the window in said windowed envelope having a height and width at least as great as that of said area on the deposit slip and so located with respect to said supplementary opening and area that the name and address of the depositor will be visible through the window when the deposit slip carrying envelope is received by the windowed envelope.

The present invention contemplates the provision of a bank deposit slip return envelope having a conventional compartment or pocket having the conventional opening or mouth opening into the compartment, provided with a supplementary or alternative opening, mouth or passageway leading into said compartment and adapted to have inserted thereinto the non-address bearing area of a folded deposit slip with the address bearing area positioned in said compartment and a window in the envelope through which the address bearing area of the folded deposit slip will be visible.

The present invention also contemplates the provision of a windowed bank deposit slip return envelope having a conventional compartment or pocket provided with the conventional opening or mouth opening into the compartment, having a supplementary or alternative opening, mouth or passageway leading into said compartment and adapted to have inserted thereinto a folded validated deposit slip with the address bearing area thereof exposed to view through the window in the envelope.

The present invention further contemplates the provision of such a window bank deposit slip return envelope further characterized by the fact that the sealing flap thereof is provided with an additional longitudinally extending fold line positioned inwardly of the conventional fold line for permitting the sealing flap to be folded downwardly below the supplementary passageway to facilitate the insertion of the folded deposit slip into said passageway.

The present invention also aims to provide a set of deposit slips including a duplicate deposit slip having a transversely extending line of perforations which is so located lengthwise of the duplicate deposit slip that when a slip is folded and inserted in the supplementary opening, the address bearing area of the folded slip will be properly located in the compartment of the envelope so that it will be visible through the window in the envelope.

With the foregoing and other objects in view, the invention will be hereinafter more fully described and more particularly pointed out in the appended claims.

In the drawings in which the same parts are denoted by the same reference numerals throughout the several views.

Figure 1:
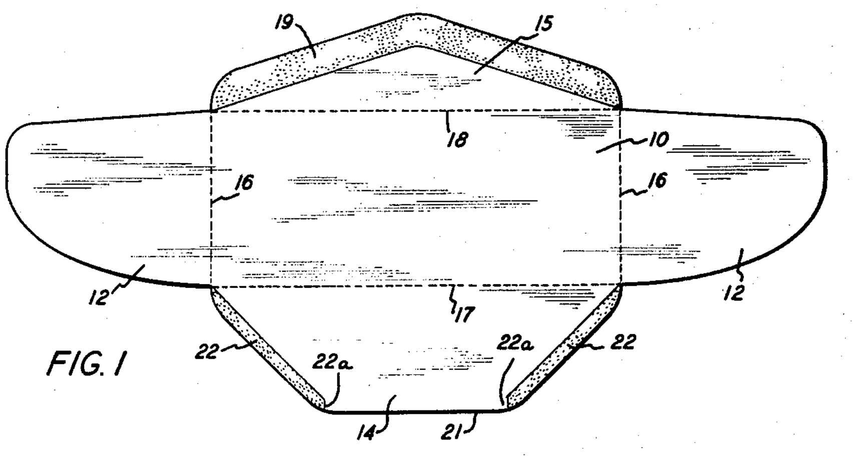
Figure 1 is an interior plan view of the blank from which the deposit slip envelope is constructed in accordance with the invention.

Referring more particularly to the drawings and especially to Figures 1 through 8, 10 indicates the body or front of the deposit slip envelope, generally indicated at 11. The body may be oblong in shape and has formed on its lateral edges side flaps 12 adapted to be folded over on the rear face of the body 10 and which are of such length that when folded a space 13 is left between their free end portions 12*a*.

A back flap 14 is formed on the lower edge of the body and a sealing flap 15 is formed on the upper edge of the body. These flaps are folded along the lines 16, 17 and 18, respectively, to form the complete envelope. The marginal edge portion of the inner face of the sealing flap 15 is provided with a suitable adhesive 19 so that the envelope can be sealed closed.

Figure 2:
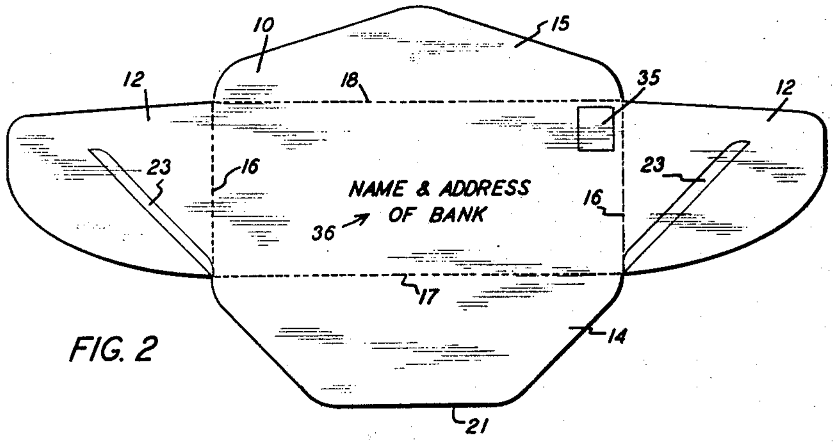
Figure 2 is an exterior plan view thereof.

The back flap 14 has the shape of a truncated triangle having the tip of the triangle cut away as at 21. The marginal edge portions of the inner faces of the sides of the back flap 14 are provided with a suitable adhesive 22, while the cut away portion 21 is left free of any adhesive. With this arrangement, when the back flap 14 is folded along the fold line 17 upon the already folded side flaps the adhesive coated portions 22 of the back flap will be secured to the rear faces of the side flaps at only the areas 23 thereof which are shown in Figure 2 of the drawing. The back flap 14 and the side flaps 12 cooperate with the front 10 to form a conventional pocket or compartment 20 having a conventional opening, mouth or passageway 20*a* opening into the compartment. The back flap cooperates with the free end portions 12*a* of the side flaps to provide a supplementary or alternative opening, mouth or passageway 24 opening into the compartment 20, the effective width of which opening is determined by the distance between the adjacent ends 22*a* of the adhesive 22.

The cut away portion 21 of the back flap brings the upper edge of the back flap below the upper edges of the side flaps 12 to facilitate the insertion of the user's fingers into the upper portion of the passageway 24 to effect the opening of the passageway for affording easy access thereto.

A set of deposit slips, generally indicated at 25, is secured by having its stub end portion 26 affixed by an appropriate adhesive to the rear faces of one of the side flaps 12 and the back flap 14 along the line 30*a*. The set of deposit slips 25 comprises an original deposit slip 27 and a duplicate deposit slip 28 with a sheet 29 of carbon paper interposed therebetween. The deposit slips may be of the conventional type used by banks and have a width substantially equal to the width of the envelope rear wall which is formed by the back flap 14 and the side flaps 12 and a length slightly less than that of the envelope. The slips and carbon paper are secured to the stub end portion 26 and may be separated in any suitable manner, such as, by a perforated line 30 which aids the bank employee in separating the bank deposit slips after validation. The deposit slips are provided with an area 31 for having inscribed thereon the name and address of the bank depositor.

An envelope 32 of the conventional type has a window 33 formed in its front wall 34.

In the use of the device, assuming that a bank depositor has one of the deposit slip envelopes 11 and wishes to make a deposit, he will fill out the original deposit slip 27 in the usual manner by listing the amount of currency and/or checks and inscribing his name and address on the area 31 provided for that purpose.

Figure 5:
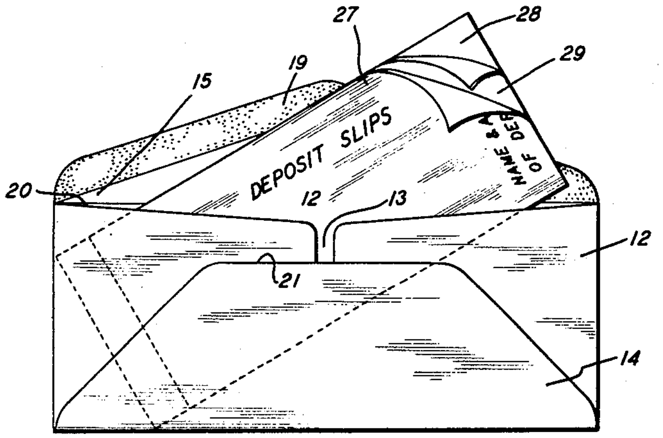
Figure 5 is a rear elevational view of the deposit slip envelope from which the deposit slips have been detached and showing the filled out deposit slips partially inserted into the envelope compartment.
Figure 6:
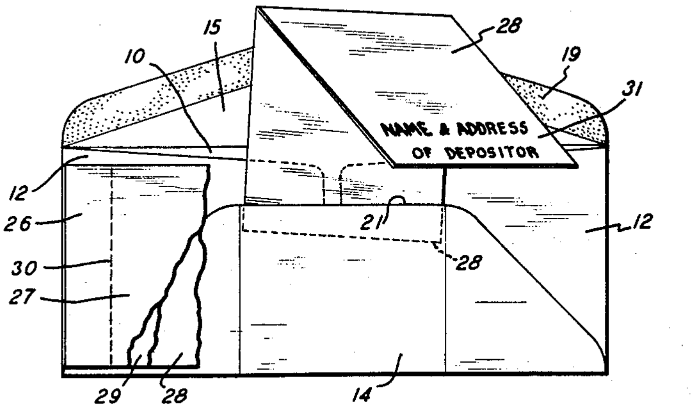
Figure 6 is a rear elevational view of the deposit slip envelope with parts broken away and showing a folded-in-half duplicate deposit slip partially inserted into the pocket thereof but through the supplementary opening thereto.

The depositor will then tear off the slips and carbon paper along the line 30*a* including stub 26, and place the original, carbon and duplicate deposit slips as a unit, with the currency and/or checks in the pocket 20 in the manner indicated in Figure 5 of the drawing. After sealing the sealing flap 15 and placing the appropriate postage in the space 35, the depositor will mail the envelope 11 to the bank, the name and address of which have previously been inscribed on the front 10 of the envelope as indicated at 36.

When the bank receives the envelope 11, an employee of the bank will remove the deposit slips, currency and/or checks and validate the deposit slips, separate them along the perforated line 30 and discard the carbon 29 and envelope 11. After validating the deposit slips, the bank employee will fold the duplicate deposit slip 28 in half or substantially in half and insert the folded slip into the supplementary opening 24 of the new envelope 11 in the manner shown in Figure 6. The half of the folded duplicate deposit slip bearing the name and address of the depositor will overlie the new set of deposit slips and be exposed to view and the sealing flap 15 will be folded down over the set of deposit slips, but not sealed as shown in Figure 7.

Figure 7:
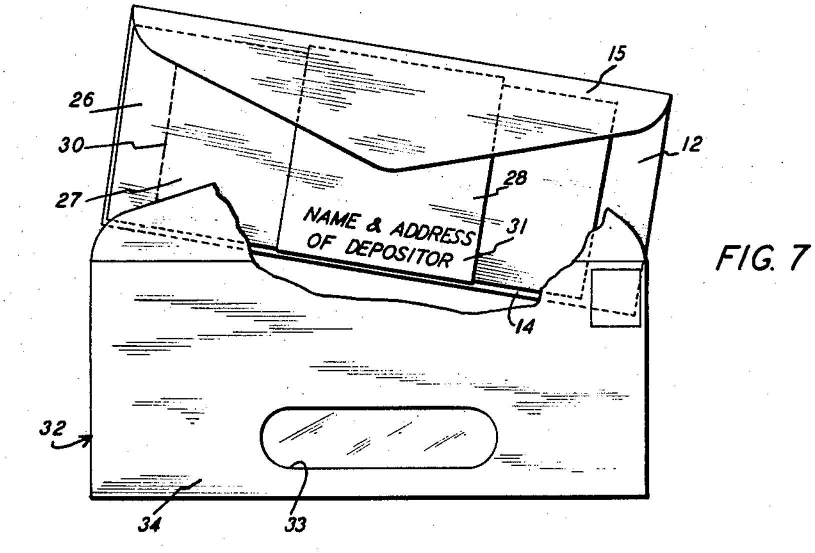
Figure 7 is a front elevational view of the windowed envelope with parts broken away and showing the deposit slip envelope partially inserted thereinto.

The new envelope 11 and the folded duplicate deposit slip will now be inserted into the windowed envelope 32 in the manner indicated in Figure 7. The relative dimensions of the envelopes 11 and 32 are such that the envelope 11 will not shift its position when it is fully housed in the envelope 32. The width of the folded deposit slip 28 is substantially the same as the effective width of the supplementary passageway 24 as determined by the points 22*a* of adherence between the back flap 14 and the side flaps 12 and is less than that of the window 33 in the envelope 32 as can be seen from the vertical lines of projection 37 in Figure 8 which generate from the opposite side edges of the deposit slip 28, pass through the points 22*a* and intersect the window 33 adjacent its opposite ends.

The width of the window 33 exceeds the width of the slip 28 by the sum of the widths of the spaces 38 which are defined by each side of the window and the adjacent line 37. With this arrangement, the slip 28 could have some lateral movement in the supplementary passageway 24 and/or the envelope 11 could have some lateral movement within the envelope 32 and the name and address in the area 31 on the slip would still be visible through the window 33 due to the provision of the spaces 38 at each side of the window.

Figure 8:
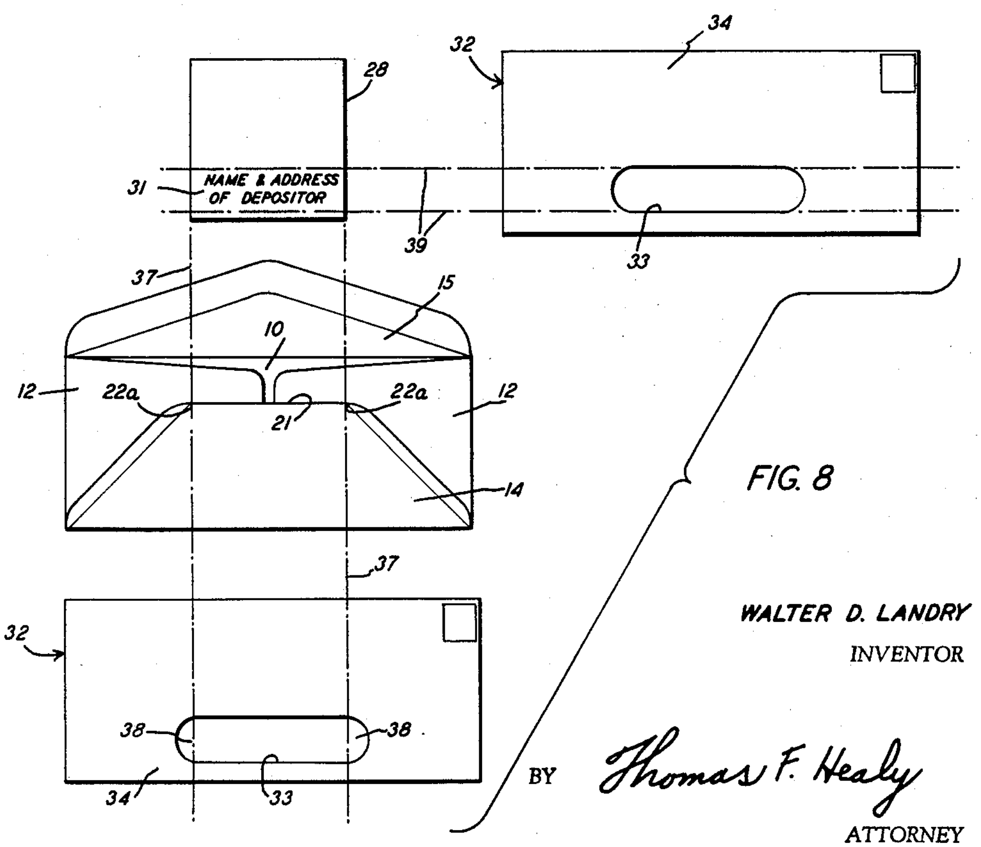
Figure 8 is a diagrammatic view showing the relative dimensions and locations of the duplicate deposit slip, the supplementary or alternative opening, mouth or passageway of the deposit slip envelope and the window of the windowed envelope.
Figure 9:
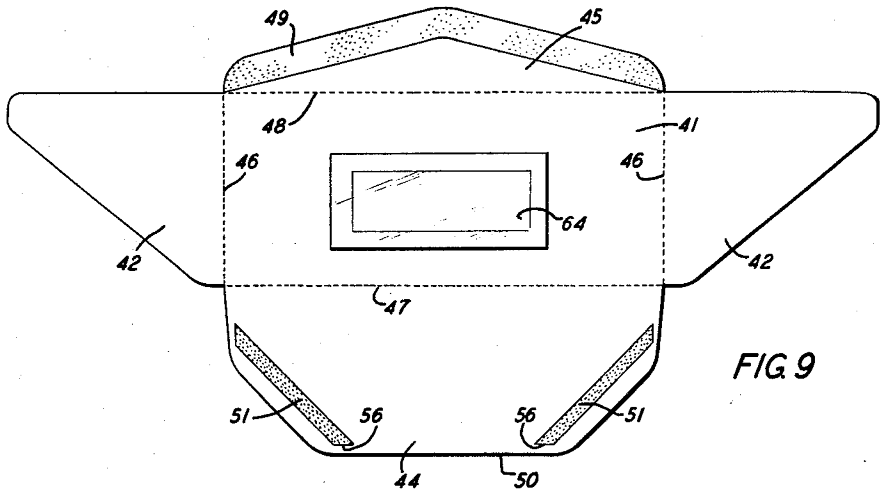
Figure 9 is an interior plan view of the blank from which a modified form of deposit slip envelope is constructed in accordance with the present invention.

It will be noted from the horizontal projection lines 39 of Figure 8 that the window 33 of the envelope 32 has a greater height than the name and address area 31 of the slip 28 so as to allow for some vertical displacement of the area 31 with respect to the window 33 and yet the name and address in the area 31 would be visible through the window. The lower edge of the envelope 11 bottoms in the envelope 32 when the envelope 11 is completely housed in the envelope 32 and the area 31 of the slip 28 is positioned the same distance from the bottom of the envelope 32 as is the window 33 so as to bring the area and window into alignment.

The projection lines 37 and 39 of Figure 8 show the relative horizontal and vertical positions of the name and address in the area 31 with respect to the window 33.

It is apparent from the above that this invention provides a bank-by-mail unit comprising a first envelope having a window therein, a second envelope, and a set of bank deposit slips detachably attached to said second envelope, said second envelope having a compartment for receiving the detached filled out deposit slips, currency and checks and a supplementary passageway for receiving a portion of a folded validated or receipted duplicate deposit slip with the name and address of the depositor exposed through said window when the second envelope is housed within the first envelope.

In the modified form of the invention illustrated in Figures 9 through 17, the window is formed in the deposit slip envelope generally indicated at 40, which may be similar in structure, size and shape to the envelope 11. The body or front of the envelope 40 is indicated at 41 and has formed on its lateral edges side flaps 42 adapted to be folded over on the rear face of the body 41 and which are of such length that when folded a space 43 is left between their free end portions 42*a*.

Figure 10:
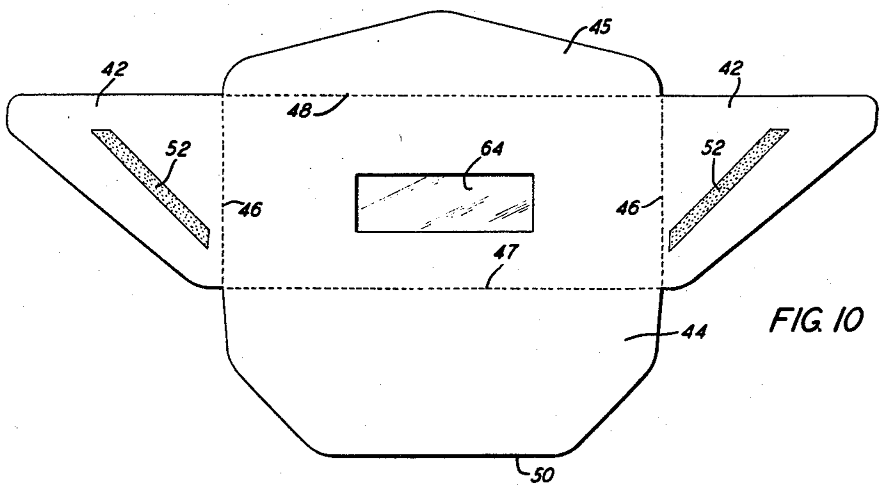
Figure 10 is an exterior plan view thereof.

A back flap 44 is formed on the lower edge of the body and a sealing flap 45 is formed on the upper edge of the body. These four flaps are folded along the fold lines 46, 47 and 48, respectively, to form the complete envelope. The marginal edge portion of the inner face of the sealing flap 45 is provided with a suitable adhesive 49 so that the envelope can be sealed. The back flap 44 has the shape of a truncated triangle having the top thereof cut away as at 50. The marginal edge portions of the inner faces of the sides of the back flap 44 are provided with a suitable adhesive 51, while the cut away portion 50 is left free of any adhesive. With this arrangement, when the back flap 44 is folded along the fold line 47 upon the already folded side flaps the adhesive coated portions 51 of the back flap will be secured to the rear faces of the side flaps at only the areas 52 thereof which are shown in Figure 10 of the drawing.

The back flap 44 and the side flaps 42 cooperate with the front 41 to form a conventional pocket or compartment 53 having a conventional opening, mouth or passageway 54 opening into the compartment. The back flap cooperates with the free end portions 42*a* of the side flaps 42 to provide a supplementary or alternative opening, mouth or passageway 55 opening into the compartment 53, the effective width of which opening is determined by the distance between the adjacent ends 56 of the adhesive 51.

The cut away portion 50 of the back flap brings the upper edge of the back flap below the upper edges of the free end portions 42*a* of the side flaps to facilitate the insertion of the user's fingers into the upper portion of the passageway 55 to effect the opening of the passageway for affording easy access thereto.

Figure 11:
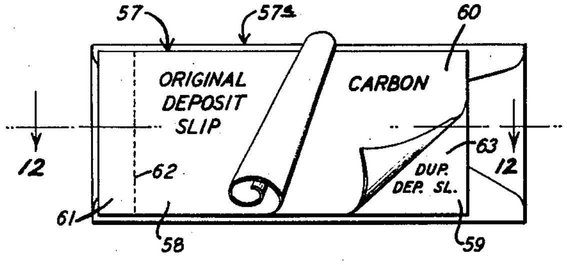
Figure 11 is a plan view of a set of deposit slips attached to a bank addressed envelope.

A set of deposit slips, generally indicated at 57 in Figure 11, comprises an original deposit slip 58 and a duplicate deposit slip 59 with a sheet 60 of carbon paper interposed therebetween. The slips 58 and 59 and the carbon paper 60 are secured to their stub 61 along perforated lines 62. The deposit slips may be of the conventional type used by banks and have an area 63 for having inscribed thereon the name and address of the bank depositor. The set of deposit slips 57 are detachably secured to the rear of a conventional type envelope 57*a* in the same manner as the deposit slips 25 are attached to the envelope 11. The front of the envelope 57*a* has inscribed thereon the name and address of the bank. A window 64 of the conventional type is formed in the front 41 of the envelope 40.

Figures 12, 13, 14, 15, 17:
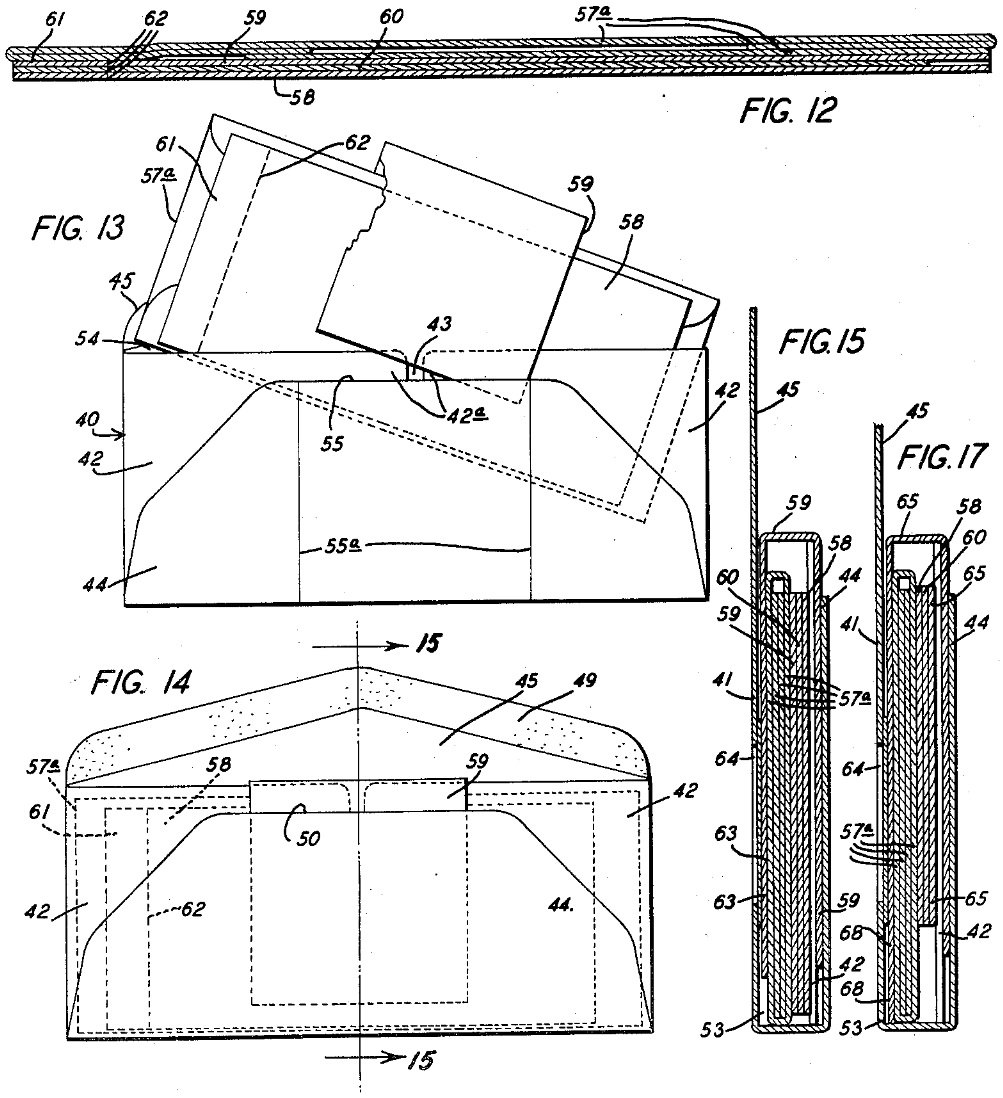
Figure 12 is a sectional view taken on the line 12—12 of Figure 11.
Figure 13 is a rear elevational view of the deposit slip envelope showing the validated receipted duplicate deposit slip and a new set of deposit slips partially inserted into the envelope.
Figure 14 is a rear elevational view of the deposit slip envelope with the validated receipted duplicate deposit slip and the new set of deposit slips completely inserted into the envelope.
Figure 15 is a sectional view taken on the line 15—15 of Figure 14.
Figure 17 is a view similar to Figure 15 but showing the modified duplicate deposit slip of Figure 16 inserted into the envelope in lieu of the duplicate deposit slip shown in Figure 11.

In the use of this form of the invention, when the bank employee receives the properly filled out set of deposit slips 57, he will validate the deposit slips and separate them along the lines 62. The bank employee will fold the validated duplicate deposit slip 59 in half or substantially in half over a new set of deposit slips 57 and envelope 57*a* and insert them into the compartment 53 of the envelope 40, as shown in Figures 13, 14 and 15. The half of the folded duplicate deposit slip bearing the name and address of the depositor will overlie the front of the envelope 57*a* and be exposed to view through the window 64 of the envelope 40. The other half of the folded duplicate slip will overlie the set of deposit slips carried by the envelope 57*a* and will be inserted through the supplementary opening 55 into the compartment 53.

The width of the folded deposit slip 59 is substantially the same as the effective width of the supplementary opening 55 as determined by the points 56 and is less than the width of the window 64 so that the name and address area 63 of the slip 59 is properly orientated to show through the window 64. The sealing flap 45 will then be sealed and the envelope 40 mailed to the depositor.

Figure 16:
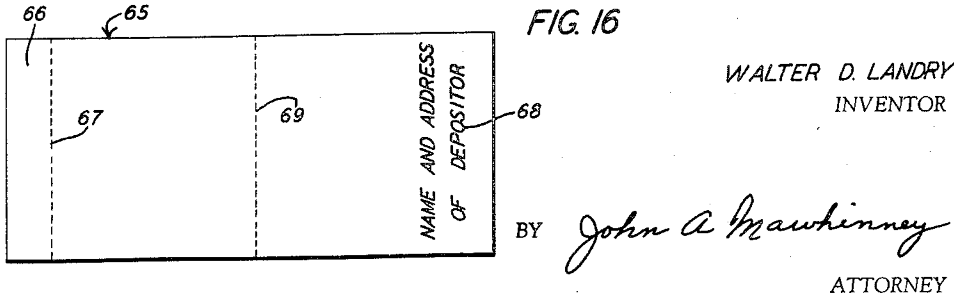
Figure 16 is a top plan view of the duplicate deposit slip modified by the provision of a transversely extending score line thereon.
Figures 18, 19:
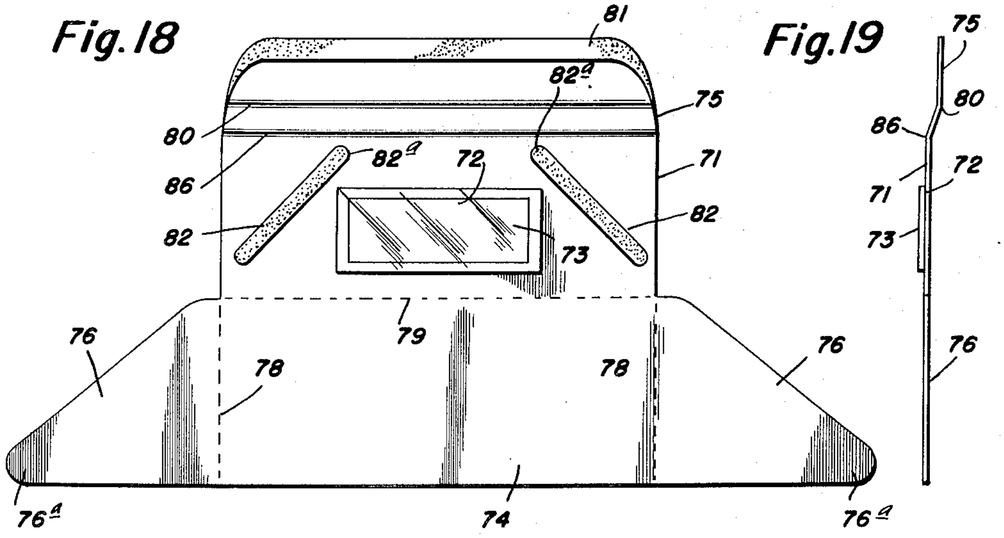
Figure 18 is an interior plan view of the blank from which a second modified form of deposit slip envelope is constructed in accordance with the present invention.
Figure 19 is an end elevational view of the same.

In Figures 16 and 17 a modified form of duplicate deposit slip 65 is shown and which is detachably secured to its stub 66 by a line of perforations 67 and is provided with a name and address receiving area 68. The slip 65 is provided with a transverse fold line of perforations 69 which is positioned closer to the perforated line 67 than to the free end of the slip 65 so that when the detached slip 65 is folded on the line 69 the portion of the slip having the area 68 therein will be longer than the other portion. With this arrangement, the free end of the area 68 of the slip 65 will bottom in the compartment 53, as is shown in Figure 17, to properly locate the name and address area within the height of the window 64, the widthwise locating of the name and address area in the window being effected in the same manner as in the case of the deposit slip 59. In the case of the slip 59, the location and height of the window 64, the height of the upper edge of the flaps 42 and the length of the slip 59 are so related that when the folded-in-half slip 59 is positioned in the passageway 55, the name and address area is exposed through the window 64.

This modified type of envelope is useful in the case where a bank depositor has arranged with his bank for the employer of the bank depositor to mail his salary check directly to his bank for deposit. The bank will fill out the deposit slips in duplicate, including the name and address of the depositor, validate the duplicate slip and insert it into an envelope 40 in folded condition so that the name and address are visible through the window 64.

The combined new set of deposit slips 57 and the bank addressed envelope 57*a* can be first inserted or stuffed into the compartment 53 of the windowed envelope 40 whenever a bank clerk is free from other duties. Later when validated duplicate deposit slips or receipts for immediate previous transactions are received by the clerk, he will fold each such receipt and insert it into the compartment 53 of one of the previously stuffed windowed envelopes 40 so that the name and address bearing area 63 of the folded duplicate deposit slip will show through the window 64 of the envelope 40. The other portion of the validated folded deposit slip will extend through the passageway 55 which serves as the aligning medium for locating and retaining the name and address bearing area of the folded receipt in its proper position so as to be at all times visible through the window 64 of the envelope 40.

The provision of the fold line 69 in the duplicate deposit slip 65 of Figures 16 and 17 serves the function of having the name and address bearing portion 68 longer than the other portion when the slip is folded on the line 69. With this arrangement, the longer name and address bearing portion will be initially inserted into the compartment 53 of the windowed envelope 40 and then the shorter other portion will be inserted into the passageway 55. This will facilitate the insertion of the shorter portion into the passageway since the longer name and address bearing portion cannot escape from the compartment during the subsequent insertion of the shorter end portion into the passageway.

Figures 20, 23:
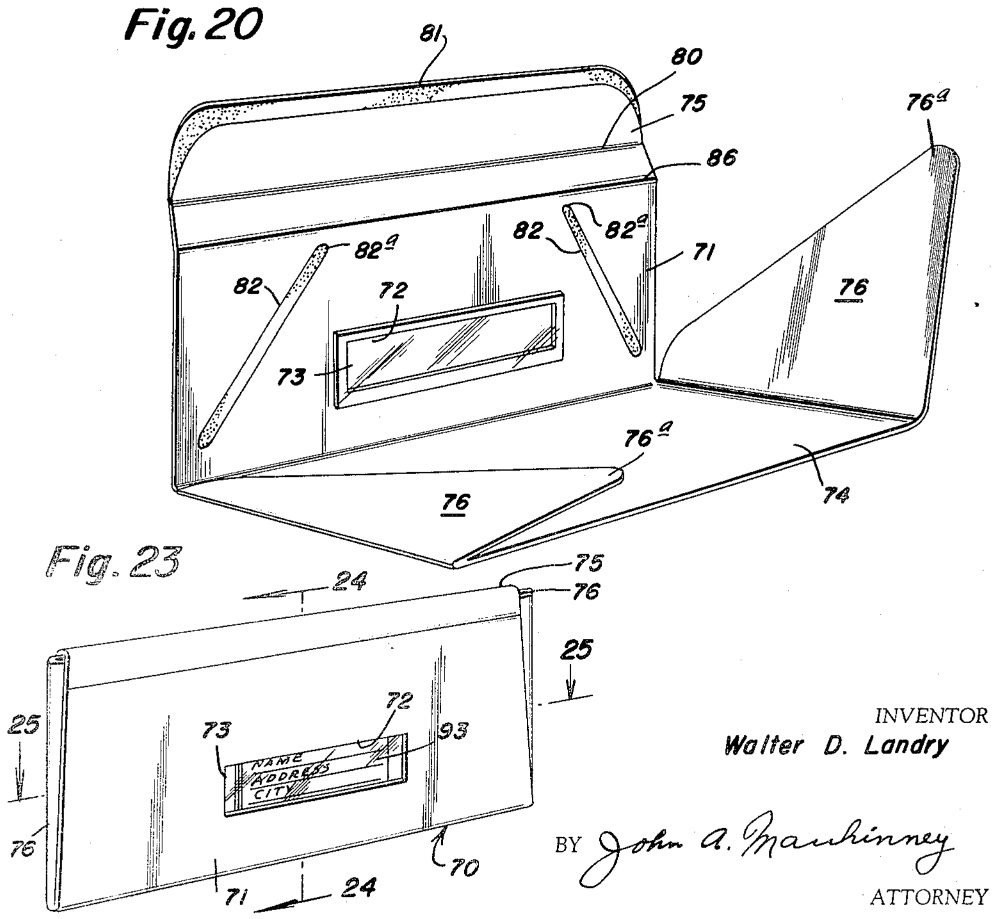
Figure 20 is an interior perspective view of the envelope in partly folded condition.
Figure 23 is a front perspective view of the envelope in its fully sealed condition.

In the modified form of the invention illustrated in Figures 18 through 25, the window is also formed in the deposit slip envelope generally indicated at 70. The body or front of the envelope 70 is indicated at 71 and is provided with an opening or window 72 which is closed by a cover of cellophane or the like 73. A back flap 74 is formed on the lower edge of the body and a sealing flap 75 is formed on the upper edge of the body. The back flap 74 has formed on its lateral edges side flaps 76 adapted to be folded over on the inner face of the back flap as indicated in Figure 20 of the drawings. The side flaps are of such a length that when folded a space 77 is left between their free end portions 76*a*. These four flaps are folded along the fold lines 78, 79 and 80.

The marginal edge portion of the inner face of the sealing flap 75 is provided with a suitable adhesive 81 so that the envelope can be sealed. The inner face of the front 71 of the envelope 70 is provided with the adhesive coated areas 82 disposed at opposite sides of the window 72 and extend upwardly in converging relation and terminate at the points 82*a* so as to provide the free end portions 76*a* of the side flaps 76 when the envelope is folded into the condition illustrated in Figure 21 of the drawings. With this arrangement, when the side flaps 76 are folded inwardly along their fold lines 78 against the inner surface of the back flap 74 and the back flap is folded along its fold line 79, the adjacent faces of the side flaps 76 are brought into engagement with the adhesive on the adhesive coated areas 82 so that the side flaps will be secured to these areas 82.

The back flap 74 cooperates with the front 71 to form a conventional pocket or compartment 83 having a conventional opening, mouth or passageway 84 opening into the compartment. The front 71 cooperates with the free end portions 76*a* of the side flaps 76 to provide a supplementary or alternative opening, mouth or passageway 85 opening into the compartment 83, the effective width of which opening is determined by the distance between the adjacent ends 82*a* of the adhesive coated areas 82.

The sealing flap 75 is provided with a second fold line 86 which is substantially parallel to the fold line 80 but is closer to the front 71 than the fold line 80. The provision of this second fold line 86 permits the sealing flap 75 to be pulled downwardly so as to expose the supplementary opening 85 to facilitate the introduction of an article therethrough as shown in Figures 21 and 22 of the drawings.

Figure 3:
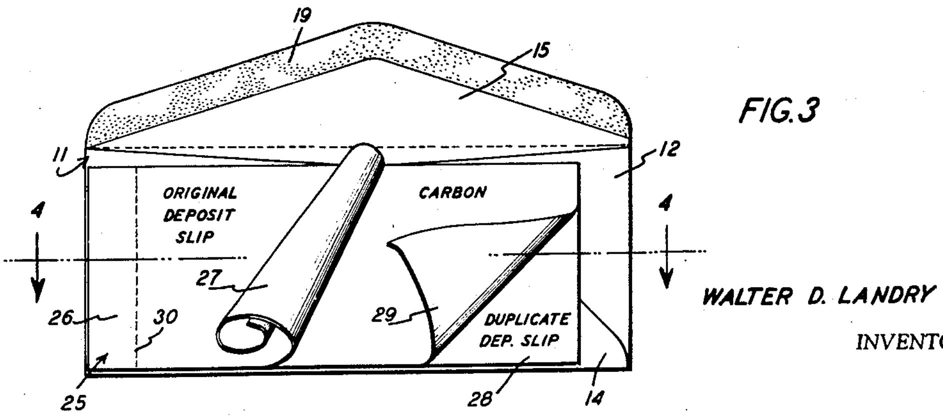
Figure 3 is a rear elevational view of the deposit slip envelope with a set of deposit slips attached thereto.
Figure 4:
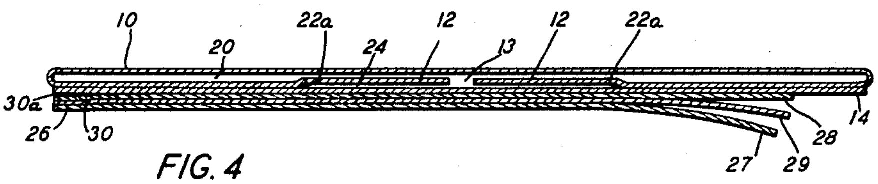
Figure 4 is a sectional view on the line 4—4 of Figure 3.
Figures 21, 22, 24, 25:
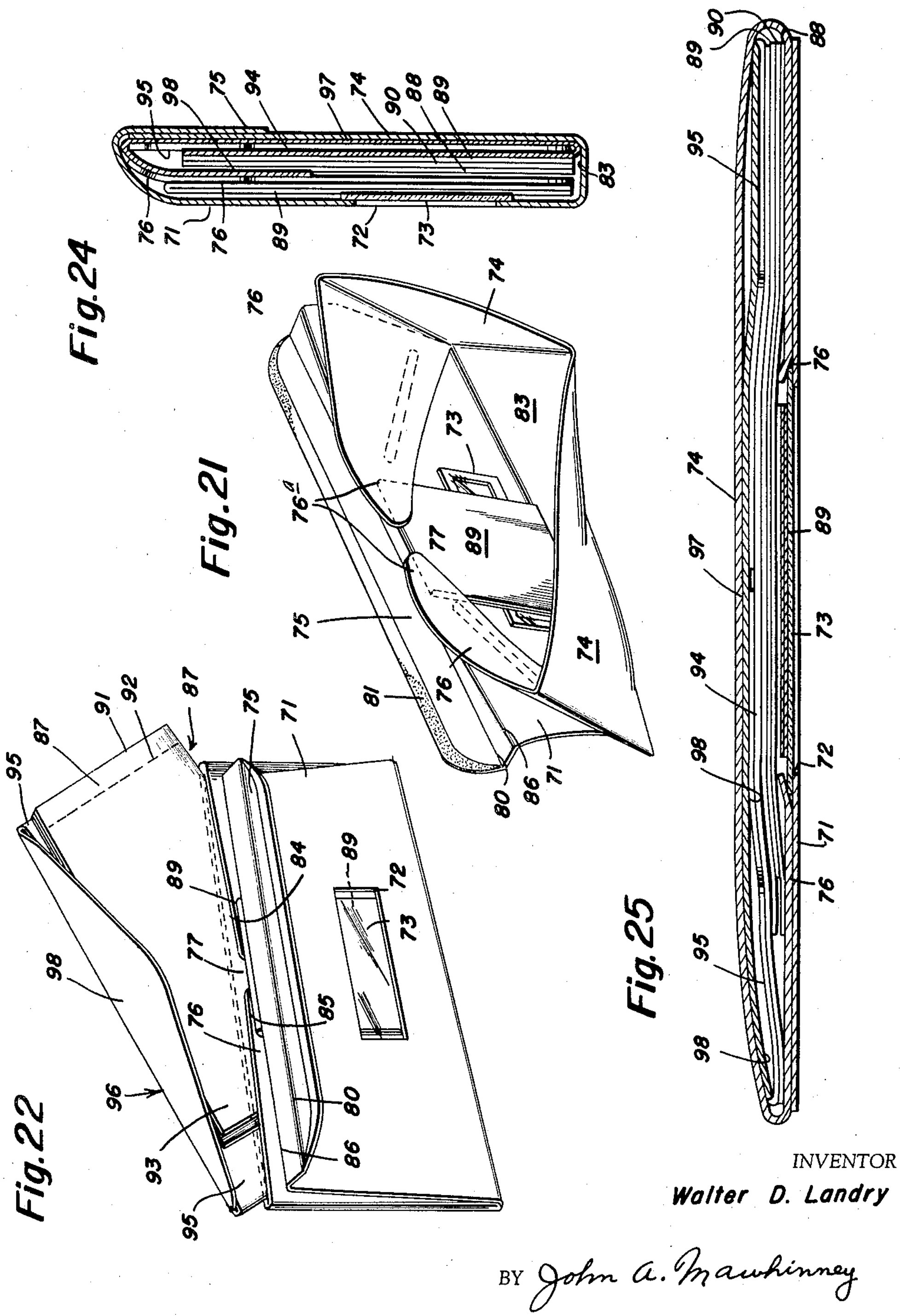
Figure 21 is a perspective view of the envelope in completely folded condition showing a folded validated deposit slip received by the supplementary passageway and expanded for the reception of material into its conventional compartment.
Figure 22 is a front perspective view of the envelope with a bank deposit slip unit carrying envelope partially inserted into its conventional compartment.
Figure 24 is a sectional view on the line 24—24 of Figure 23 with a deposit slip assembly and folded duplicate deposit slip not sectioned for the sake of clarity.
Figure 25 is a sectional view on the line 25—25 of Figure 23 with parts of deposit slip envelope not sectioned for the sake of clarity.

A set of deposit slips, generally indicated at 87 in Figures 22, 24 and 25, comprises an original deposit slip 88 and a duplicate deposit slip 89 with a sheet 90 of carbon paper interposed therebetween. The slips 88 and 89 and the carbon paper 90 are secured to their stub 91 along perforated lines 92. The deposit slips may be of the conventional type used by banks and have an area 93 for having inscribed thereon the name and address of the bank depositor. The set of deposit slips 87 are detachably secured to the back flap 94 and to one of the side flaps 95 of a conventional type envelope 96 in the same manner as the deposit slips 25 are attached to the envelope 11 as shown in Figures 3 and 4 of the drawings. The front 97 of the envelope 96 has inscribed thereon the name and address of the bank. The sealing flap 98 of the envelope 96 overlies the set of deposit slips 87 as shown in Figures 22 and 24.

In the use of this form of the invention, a combined new set of deposit slips 87 and the bank addressed envelope 96 will be first inserted or stuffed into the compartment 83 of the envelope 70. This operation can be performed whenever a bank employee is free from other duties. When a bank employee receives the properly filled out set of deposit slips 87, he will validate the deposit slips and separate them along the lines 92. The bank employee will fold the validated duplicate deposit slip 89 in half or substantially in half and insert it through the supplementary opening 85 into the compartment 83 of the envelope 70. The insertion of the validated duplicate deposit slip 89 is facilitated by folding the sealing flap 75 downwardly along its fold line 86 so as to bring the sealing flap below the upper edges of the free end portions 76*a* of the side flaps 76 so as to expose the supplementary opening 85.

The width of the folded duplicate deposit slip 89 is substantially the same as the effective width of the supplementary opening 85 as determined by the terminal points 82*a* of the adhesive coated areas 82 and is less than the width of the window 72 of the envelope 70 so that the name and address area 93 of the slip 89 is properly orientated to show through the window 72. The sealing flap 75 will then be folded along its line 80 and sealed to the upper edge portion of the back flap 74 in the conventional manner. The folded validated duplicate deposit slip 89 will be restrained against undue horizontal and vertical movement in the same manner as that described in connection with the other forms of the invention illustrated in Figures 1 through 17 of the drawings so that the name and address on the folded duplicate deposit slip will at all times be visible through the window 72 of the envelope 70.

Figures 26, 27:
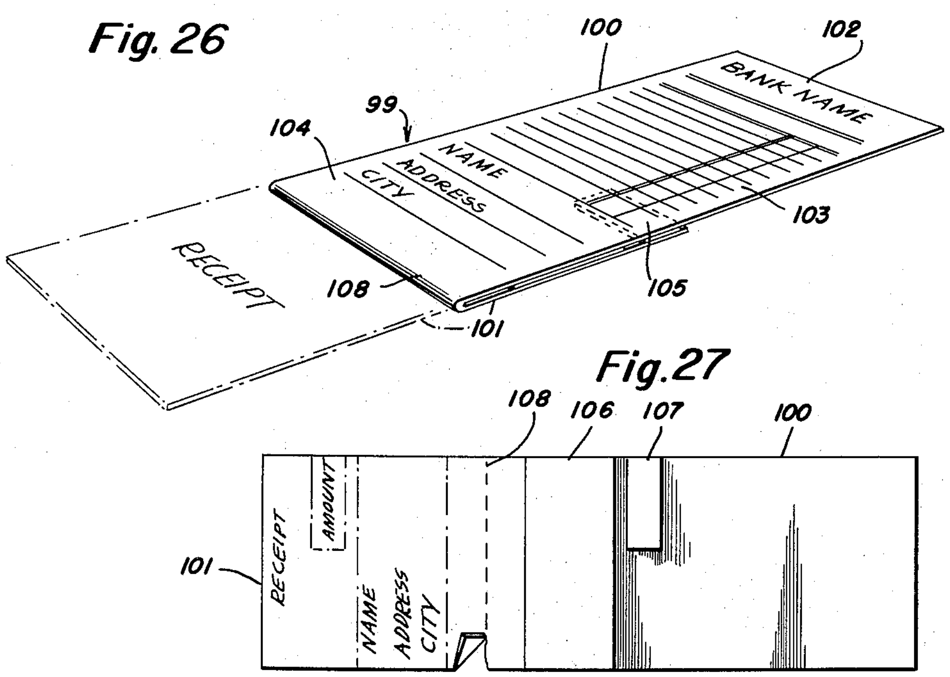
Figure 26 is a top perspective view of a modified form of deposit slip.
Figure 27 is a bottom plan view of the same.

If the bank or other user so wishes, instead of using the set of deposit slips 87 a deposit slip shown in Figures 26 and 27 of the drawings and generally indicated at 99 can be used. The deposit slip 99 is formed in one integral piece and comprises an original deposit slip portion 100 which may be of the conventional arrangement and a receipt portion 101. The original deposit slip portion 100 is provided with an area 102 for receiving the name of the bank, an area 103 for having recorded the amount of the checks, cash, et cetera, being deposited and other pertinent information relating thereto, and an area 104 for receiving the name and address of the depositor. These three areas 102, 103 and 104 are provided on the upper or front face of the original deposit slip portion 100 and the area 103 is also provided with an area for receiving the total amount being deposited, as indicated at 105. On its underside or back the original deposit slip portion 100 is provided with a carbonized strip 106 which coincides with the name and address of the depositor receiving area 104 and a second carbonized strip 107 coinciding with the total amount deposited area 105. The receipt portion 101 is detachably secured to the original deposit slip portion 100 by a score line 108.

In the use of this form of deposit slip, the receipt portion 101 is folded over upon the back of the original deposit slip portion 100 as illustrated in full lines in Figure 26 of the drawings. The depositor will fill in the amounts of the checks, cash and other deposits he wishes to make, together with any additional information required by the bank. He will then total the amount of his deposits and enter it in the area 105 and will write his name and address in the area 104. The total amount and the name and address of the depositor will be transferred to the rear face of the receipt portion 101 by the carbonized strips 106 and 107 so that it will not be necessary for the bank teller to make such entries on the receipt portion 101. The bank teller will merely have to validate the receipt portion and detach it along the score line 108. This validated receipt portion 101 will then be introduced through the supplementary opening 85 of the envelope 70 and it is of such a height and width that it will be retained in position so that the name and address of the depositor will be visible at all times through the window 72.

Figures 28, 29:
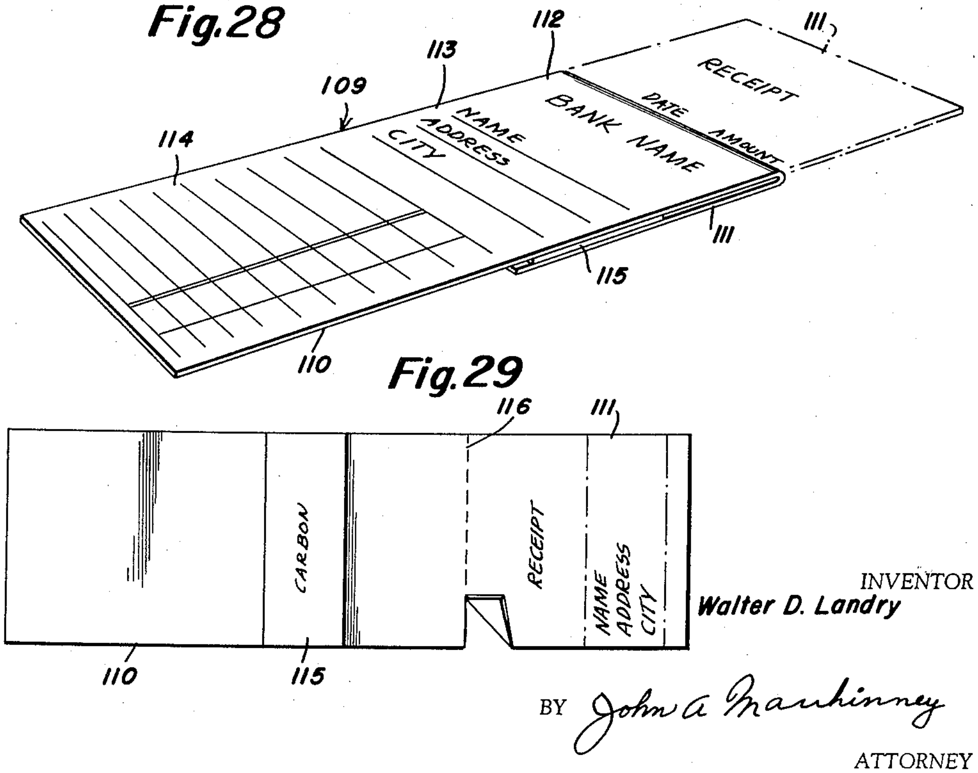
Figure 28 is a top perspective view of another form of deposit slip.
Figure 29 is a bottom plan view of the same.

In Figures 28 and 29 of the drawings there is illustrated a deposit slip, generally indicated at 109, which is adapted for use in NCR machines. This deposit slip 109 comprises an original deposit slip portion 110 and a receipt portion 111. The upper or front face of the original deposit slip portion 110 is provided with an area 112 for receiving the name of the bank, an area 113 for receiving the name and address of the depositor and an area 114 for receiving the amounts of checks, cash, et cetera, and other necessary information, and a total of the amount to be deposited. On its under or back side the original deposit slip portion 110 is provided with a carbonized strip 115 which is in alignment with the name and address of the depositor receiving area 113 so that when the depositor writes his name and address on the front of the deposit slip portion 110 in the area 113 it will be transferred to the back of the receipt portion 111 by means of the carbonized strip 115. The bank clerk will place the deposit slip 109 in the NCR machine and operate the proper buttons so that the amount and date of the deposit will be validated or inscribed upon the receipt portion 111. The receipt portion will then be detached from the original deposit slip portion 110 by tearing it along the score line 116. The validated receipt portion 111 will then be inserted into the supplementary opening 85 of the envelope 70 and the dimensions of the receipt portion 111 are such that it will be retained in proper position within the supplementary opening 85 and compartment 83 so that the name and address of the depositor will be visible at all times through the window 72 of the envelope 70.

The front face of the receipt portion 101 of the deposit slip 99 and the front face of the receipt portion 111 of the deposit slip 109 have inscribed thereon the name and address of the bank. The deposit slips 99 and 109 may be attached to bank addressed envelopes such as 96 shown in Figure 22 of the drawings, or they may be separate and independent of the envelope 96. The deposit slips 99 and 109, either attached to bank addressed envelopes 96 or separate therefrom, will be placed in the compartment 83 of the envelope 70 for mailing to the depositor when returning to him his validated duplicate receipt portion.

It will be noted from the above that one of the results of this invention is to develop an envelope that is required to carry two objects dissimilar in size. One of these two objects will be substantially the same size as the envelope and will fit snugly therein. The other of these objects, much smaller in size, carries a name and address, put there originally for purposes of identification. It is desired to use this name and address for mailing purposes. An envelope has been developed having a window and immediately behind the window there is provided a slot or passageway of approximately the same width as the address bearing object. When the address bearing object is inserted into the slot or passageway, it will cause the name and address on the name and address bearing object to show through the window so that our objective is accomplished. Furthermore, being contained within this slot or passageway, the name and address on the name and address bearing object will remain in proper position to be seen through the window.

It will be noted that in all forms of the invention the means for attaching the side flaps to their panel terminate at points outwardly of the inner end portions of the side flaps so as to provide inner free end portions of the side flaps which constitute the supplementary mouth to the main pocket of the container and serve as anchoring means the width of which is determined by the inner points of termination of the adhesive means. With this arrangement the width of the anchoring means is substantially the same as the width of the deposit slip or other element or object bearing the indicia so that the element or object is anchored in the pocket by the anchoring means so that the indicia on said element is at all times visible through the viewing window.

It is obvious that various changes and modifications may be made in the details of construction and design of the above specifically described embodiments of this invention without departing from the spirit thereof, such changes and modifications being restricted only by the scope of the following claims.

What I claim is:

1. A business-by-carrier unit for receiving an object having thereon name and address indicia comprising a container having a front panel provided with a viewing window, a back panel, a side flap extending from each lateral edge of said back panel, said flaps being folded over upon the inner face of said back panel and said panels being folded towards one another to provide a pocket of larger dimensions than the object, means for securing said flaps to the front panel with adjacent portions of said flaps free from said front panel and adjacent said window to provide anchoring means for receiving therebetween said object so as to retain said object in said pocket with its indicia visible through said window at all times.

2. A business-by-carrier unit for receiving two objects of different sizes at least the smaller of which has name and address indicia thereon comprising an envelope having a front panel and a back panel defining a pocket having a length substantially equal to the length of the panels and the length and width of the larger of the two objects for receiving therein the larger of the two objects, a viewing window in said front panel, a side flap extending from each lateral edge of said back panel and folded upon and attached to the inner face of the front panel so as to lie between said panels and cooperating with said back panel to provide an entrance mouth to said pocket having a length substantially equal to the length of the pocket, the inner adjacent end portions of said flaps being free of attachment to said front panel, the inner points of attachment of the flaps to the front panel terminating short of the inner free ends of said flaps to provide inner end flap portions free of said front panel but cooperating with said front panel to define therewith a supplementary mouth opening into said pocket the width of which supplementary mouth is limited by the inner points of attachment of the flaps to said front panel so that said width substantially equals the width of the smaller of said objects whereby when the smaller object is positioned in said supplementary mouth and pocket the indicia thereon will at all times be visible through the window.

3. A business-by-carrier unit as claimed in claim 2, wherein said front panel carries a sealing flap joined thereto by a fold line disposed below the upper edge of said supplementary mouth whereby the sealing flap can be folded downwardly along said fold line to position the sealing flap below the upper edge of the supplementary mouth and said sealing flap serves as a finger grip to move the sealing flap and said front panel away from the free end portions of the side flaps to enlarge said supplementary mouth.

4. A business-by-carrier unit as claimed in claim 3, wherein said sealing flap is adapted to close said mouths and pocket and is provided with the conventional fold line upon which the sealing flap is moved to its closing position, said conventional fold line being disposed outwardly of said first fold line.

5. A business-by-carrier unit comprising a set of elements adapted to have indicia inscribed thereon and to have at least a portion thereof detachable from the set, an envelope comprising a front panel and a back panel defining therebetween a pocket having a length and width substantially equal to the length and width of said set of elements in their original form for receiving therein said set of elements, a viewing window in said front panel, a side flap extending from each lateral edge of said back panel and folded upon and attached to the inner face of the front panel so as to lie between said panels and cooperating with said back panel to provide an entrance mouth to said pocket having a length substantially equal to the length of the pocket, the inner adjacent end portions of said flaps being free of attachment to said front panel, the inner points of attachment of the flaps to the front panel terminating short of the inner free ends of said flaps to provide inner end flap portions free of said front panel but cooperating therewith to define a supplementary mouth opening into said pocket the width of which supplementary mouth is limited by the inner points of attachment of the flaps to said front panel so that said width substantially equals the width of the detachable portion of said set of elements whereby when said detachable portion is positioned in said supplementary mouth and pocket the indicia thereon will at all times be visible through the window.

6. A business-by-carrier unit for receiving an object having thereon name and address indicia comprising a container having a first panel having a length greater than its width and provided with a viewing window having a length greater than the width with its length extending in the same direction as the length of the first panel, a second panel, a pair of side flaps extending from the opposite lateral edges of said second panel, said flaps being folded upon the inner face of the second panel and said panels being folded toward one another, and securing means holding the flaps to the first panel and holding the panels in their folded arrangement to provide a pocket substantially coextensive with the second panel, said securing means being located adjacent the opposite ends of said window, spaced from one another and spaced from the respective ends of the flaps to provide an anchoring means cooperating with said first panel for holding said object in face contact with said first panel with the name and address indicia visible through said window at all times.

7. A blank for forming a container for receiving two objects of different sizes at least the smaller of which has thereon name and address indicia comprising a front elongated rectangular panel having a window therein, a gummed flap secured to the free longitudinal edge of the front panel, a back panel, said front and back panels being of substantially the same size and shape to define the size of the completed container, a side flap extending from and outwardly beyond each lateral edge of said back panel, one free edge of each flap being substantially in line with the free edge of the back panel, said flaps adapted to be folded upon the inner face of said back panel and said back panel adapted to be folded toward said front panel, and adhesive means on the inner face of said front panel only adjacent each end thereof and closely adjacent to said gummed flap, said adhesive means extending inwardly and terminating at a point spaced from the respective ends of the front panel a distance less than the respective end flaps for securing said flaps to the inner face of said front panel to hold the flaps and panels in their folded condition to provide a pocket of substantially the same size as the panels and the completed container for the reception of the larger of the two objects and to provide means adjacent the window in the front panel for anchoring said smaller of the two objects in said pocket with said indicia visible through the window at all times.

References Cited in the file of this patent

UNITED STATES PATENTS

| | | |
|---|---|---|
| 331,355 | Williams | Dec. 1, 1885 |
| 2,175,508 | Mandelbaum | Oct. 10, 1939 |
| 2,354,820 | McCarty | Aug. 1, 1944 |
| 2,749,021 | Hiersteiner | June 5, 1956 |